(12) United States Patent
Hayashi

(10) Patent No.: US 11,135,726 B2
(45) Date of Patent: Oct. 5, 2021

(54) AUTONOMOUSLY ACTING ROBOT THAT ACCEPTS A GUEST

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 269 days.

(21) Appl. No.: 16/294,921

(22) Filed: Mar. 7, 2019

(65) Prior Publication Data

US 2019/0202065 A1 Jul. 4, 2019

Related U.S. Application Data

(63) Continuation of application No. PCT/JP2017/032245, filed on Sep. 7, 2017.

(30) Foreign Application Priority Data

Sep. 9, 2016 (JP) .............................. JP2016-176205

(51) Int. Cl.
 *B25J 9/16* (2006.01)
 *B25J 13/08* (2006.01)
 *A63H 3/28* (2006.01)
 *B25J 13/00* (2006.01)
 *A63H 11/00* (2006.01)

(52) U.S. Cl.
 CPC .............. *B25J 13/006* (2013.01); *A63H 3/28* (2013.01); *A63H 11/00* (2013.01); *B25J 9/1664* (2013.01); *B25J 13/081* (2013.01); *A63H 2200/00* (2013.01)

(58) Field of Classification Search
 CPC ...... A63H 3/28; A63H 11/00; A63H 2200/00; B25J 9/1664; B25J 13/081; B25J 13/006
 See application file for complete search history.

(56) References Cited

U.S. PATENT DOCUMENTS 4,318,245 A * 3/1982 Stowell .................... A63H 3/28
 446/303
6,565,371 B1 5/2003 Watanabe
 (Continued)

FOREIGN PATENT DOCUMENTS

CN 100467236 C 3/2009
CN 104736212 A 6/2015
 (Continued)

OTHER PUBLICATIONS

Sabella; "The Internet of Things and Near Field Communication on Display at Connected World Conference at the Chicago Auto Show"; www.nfcbootcamp.com; 2015 (Year: 2105).*
 (Continued)

*Primary Examiner* — Stephen Holwerda
(74) *Attorney, Agent, or Firm* — Hauptman Ham, LLP

(57) ABSTRACT

A guest robot acquires a right of access to a resource a host robot can access after accreditation by the host robot. The host robot accredits the guest robot on condition that the guest robot is positioned within a predetermined distance. The guest robot receives behavioral characteristic information from a server that determines behavioral characteristics of the host robot, and selects a motion in accordance with the behavioral characteristic information. A behavioral restriction that is not imposed on the host robot may be imposed on the guest robot.

23 Claims, 12 Drawing Sheets

(56) References Cited

U.S. PATENT DOCUMENTS

| | | | |
|---|---|---|---|
| 6,773,344 B1* | 8/2004 | Gabai | A63H 3/28 |
| | | | 463/1 |
| 9,443,515 B1 | 9/2016 | Boyce | |
| 9,712,359 B2* | 7/2017 | Snyder | H04L 27/2611 |
| 2003/0109959 A1* | 6/2003 | Tajima | G06N 3/008 |
| | | | 700/245 |
| 2004/0153211 A1 | 8/2004 | Kamoto et al. | |
| 2006/0195598 A1 | 8/2006 | Fujita et al. | |
| 2007/0112463 A1 | 5/2007 | Roh et al. | |
| 2008/0275592 A1 | 11/2008 | Kim | |
| 2010/0298976 A1* | 11/2010 | Sugihara | A63H 11/20 |
| | | | 700/248 |
| 2013/0038446 A1* | 2/2013 | Huseth | G08B 21/0202 |
| | | | 340/539.13 |
| 2013/0226343 A1* | 8/2013 | Baiden | B25J 13/006 |
| | | | 700/248 |
| 2015/0032293 A1* | 1/2015 | O'Neill | F41H 11/16 |
| | | | 701/2 |
| 2015/0133025 A1* | 5/2015 | Ponomarev | A63H 3/36 |
| | | | 446/484 |
| 2015/0265934 A1 | 9/2015 | Taylor | |
| 2015/0336276 A1 | 11/2015 | Song et al. | |
| 2016/0121229 A1 | 5/2016 | Guo | |
| 2016/0129597 A1 | 5/2016 | Wang et al. | |
| 2019/0202065 A1 | 7/2019 | Hayashi | |

FOREIGN PATENT DOCUMENTS

| | | | | |
|---|---|---|---|---|
| CN | 204973044 U | | 1/2016 | |
| JP | 2000-323219 A | | 11/2000 | |
| JP | 2003-205483 A | | 7/2003 | |
| JP | 2004-309523 A | | 11/2004 | |
| JP | 2005184304 A | | 7/2005 | |
| JP | 2007-136665 A | | 6/2007 | |
| JP | 2013-13946 A | | 1/2013 | |
| JP | 5765095 B2 | | 8/2015 | |
| JP | 201691531 A | | 5/2016 | |
| WO | WO-2015198318 A1 | * | 12/2015 | ............ A63H 3/006 |
| WO | 2018047900 A1 | | 3/2018 | |

OTHER PUBLICATIONS

International Search Report in PCT/JP2017/032245, dated Nov. 21, 2017. 4pp.

Office Action in JP Application No. 2018-538464, dated Nov. 13, 2018. 9pp.

Office Action in DE Application No. 112017004554.1, dated Apr. 7, 2020. 10pp.

Office Action in CN application No. 201780055038.0, dated Jul. 3, 2020, 12pp.

Written Opinion of the ISA in PCT/JP2017/032245, dated Nov. 21, 2017, 11 pp.

Office Action in GB Application No. 1903072.5, dated Apr. 22, 2021. 4pp.

Office Action in JP Application No. 2019-130873, dated Aug. 4, 2021. 6pp.

* cited by examiner

*FIG. 9*

| | | |
|---|---|---|
| OMNIDIRECTIONAL CAMERA | ◉ OK | ○ NG |
| — VIDEO RECORDING | ○ OK | ◉ NG |
| — STILL IMAGE RECORDING | ◉ OK | ○ NG |
| MICROPHONE | ◉ OK | ○ NG |
| — VOICE RECORDING | ◉ OK | ○ NG |
| MOVEMENT SPEED | ◉ Normal | ○ Low |

POSSIBLE ACTIVITY RANGE

☑ LIVING ROOM ☐ BEDROOM ☑ DINING ROOM

☐ BATHROOM ☐ CHILDREN'S ROOM

180

AUTONOMOUSLY ACTING ROBOT THAT ACCEPTS A GUEST

RELATED APPLICATIONS

The present application is a continuation of International Application No. PCT/JP2017/032245, filed Sep. 7, 2017, which claims priority from Japanese Application No. 2016-176205, filed Sep. 9, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

A human keeps a pet in a search for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to Patent Document 1). Although robot technology has advanced swiftly in recent years, the technology has not advanced so far as to realize a presence as a pet-like companion.

CITATION LIST

Patent Literature

Patent Document 1: JP-A-2000-323219

SUMMARY OF INVENTION

Technical Problem

In order to cause a robot to exhibit a "presence as a companion", it is necessary to bring behavioral characteristics of the robot close to those of a living being. Not only this, it is desirable that the enjoyments of keeping a pet are also provided by the robot. One of the enjoyments of keeping a pet is that fellow owners become close through their pets. Consequently, it is thought that in the case of a robot too, affection toward the robot can be further deepened if there is a system of encouraging interchange between fellow robots.

The invention, being an invention completed based on the heretofore described recognition, has a main object of providing a system such that a host robot accepts a guest robot as a companion.

Solution to Problem

An autonomously acting robot (a guest robot) in an aspect of the invention includes an operation selecting unit that selects a motion, a drive mechanism that executes a motion selected by the operation selecting unit, and an access managing unit that, after accreditation by a host robot, acquires a right of access to a resource the host robot can access.

An autonomously acting robot (host robot) in another aspect of the invention includes a behavioral characteristic receiving unit that receives behavioral characteristic information from a server, an operation selecting unit that selects a motion in accordance with the behavioral characteristic information, a drive mechanism that executes a motion selected by the operation selecting unit, an accreditation unit that executes a process of accrediting a guest robot, and an access managing unit that sets a right of access to a predetermined resource for the guest robot after accreditation.

An autonomously acting robot (a host robot) in another aspect of the invention is capable of communication by both short-range wireless communication means, which has a first distance as a distance within which communication can be carried out, and remote wireless communication means, which has a second distance longer than the first distance as a distance within which communication can be carried out.

The robot includes an accreditation unit that accredits a guest robot via the short-range wireless communication means, and an access managing unit that sets a right of access to a predetermined resource for the guest robot after accreditation.

A server in an aspect of the invention includes a behavioral characteristic transmitting unit that transmits behavioral characteristic information to a host robot, and a connection unit that connects to a guest robot on condition that the guest robot is accredited by the host robot.

The behavioral characteristic transmitting unit transmits behavioral characteristic information that imposes a restriction condition on the guest robot that is not imposed on the host robot.

A server in another aspect of the invention includes a connection unit that connects to an autonomously acting robot using both a first wireless communication line and a second wireless communication line in a frequency band differing from that of the first wireless communication line, and a behavioral characteristic transmitting unit that transmits behavioral characteristic information defining an action selection method of the autonomously acting robot via both the first and second wireless communication lines.

An access control program in an aspect of the invention causes a computer to execute a function of accrediting a first device, a function of setting a right of access to a predetermined resource for the first device after accrediting the first device, and a function of setting a right of access to the resource for a second device on condition that the second device is accredited by the first device.

A behavior control program in an aspect of the invention causes a computer to execute a function of transmitting behavioral characteristic information defining an action selection method to a host robot, and a function of transmitting behavioral characteristic information that imposes a restriction condition on a guest robot that is not imposed on the host robot, on condition that the guest robot is accredited by the host robot.

Advantageous Effects of Invention

According to the invention, interchange between owners through robots is easily encouraged.

BRIEF DESCRIPTION OF DRAWINGS

FIG. 9 is a view of a restriction setting screen.

DESCRIPTION OF EMBODIMENTS

An autonomously acting robot in an embodiment functions as both a guest robot and a host robot that accepts a guest robot. A dwelling to which a host robot belongs is called a "home X".

Figure 1A:
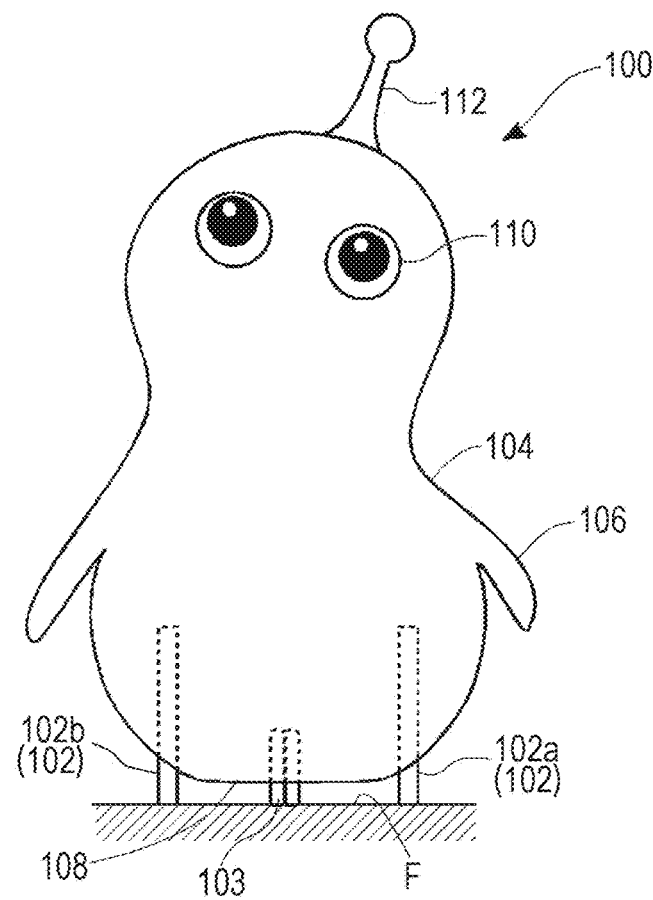
FIG. 1A is a front external view of a robot.
Figure 1B:
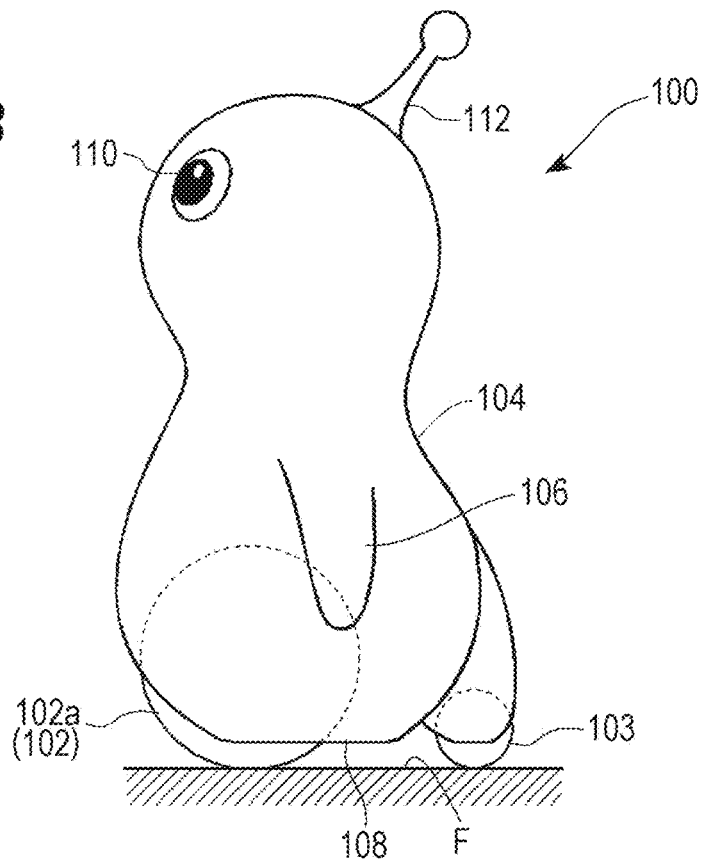
FIG. 1B is a side external view of the robot.

FIG. 1A is a front external view of a robot 100. FIG. 1B is a side external view of the robot 100.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

The robot 100, in principle, has an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, but when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a microphone array that can identify a sound source direction and an ultrasound sensor, are mounted in the robot 100. Also, the robot 100 incorporates a speaker, and is also capable of simple vocalization.

A horn 112 is attached to a head portion of the robot 100. As the robot 100 is lightweight, as heretofore described, a user can also lift up the robot 100 by grasping the horn 112. An omnidirectional camera is attached to the horn 112, and can film a whole region above the robot 100 at one time.

Figure 2:
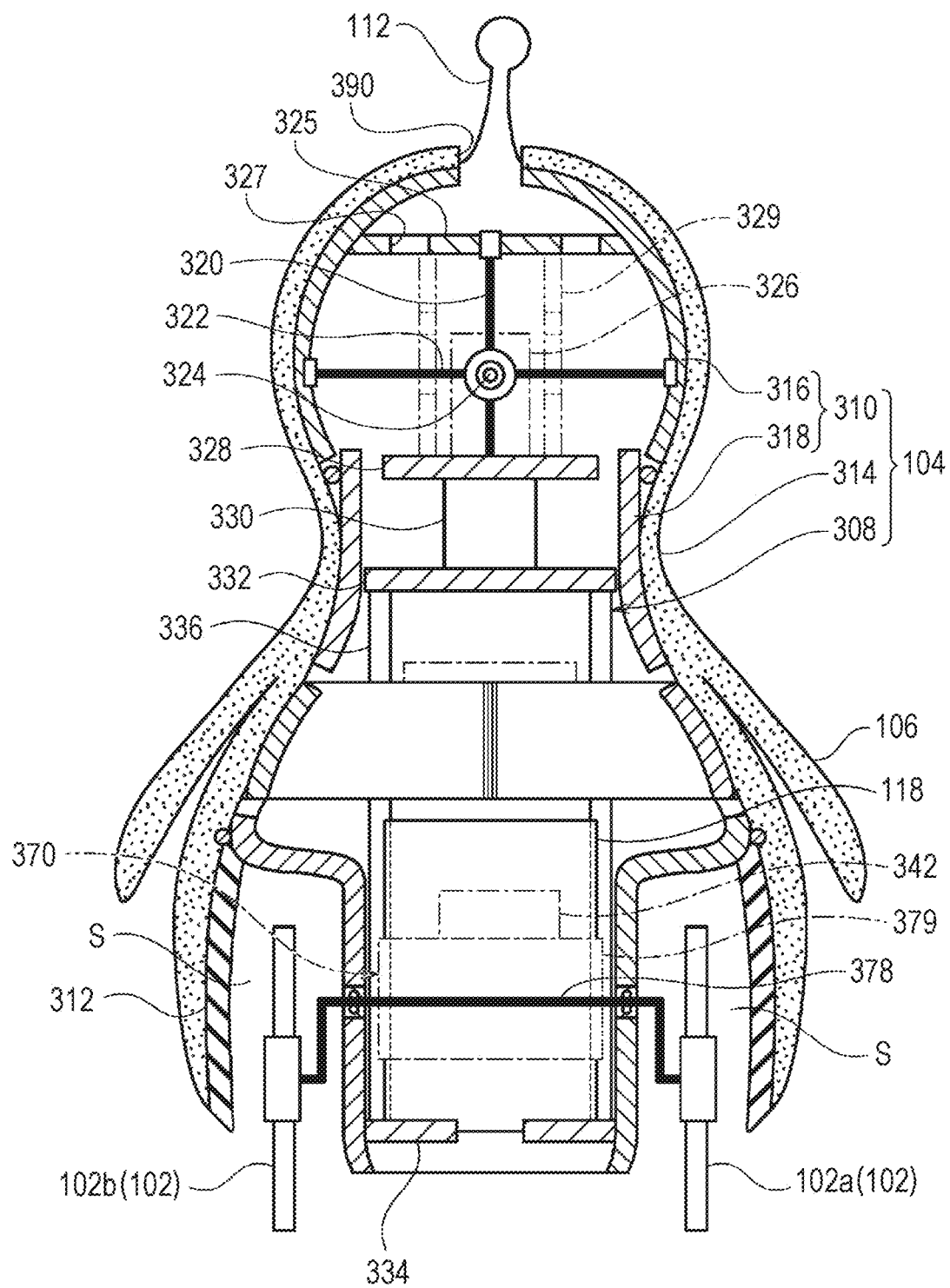
FIG. 2 is a sectional view schematically representing a structure of the robot.

FIG. 2 is a sectional view schematically representing a structure of the robot 100.

As shown in FIG. 2, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control device 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 3:
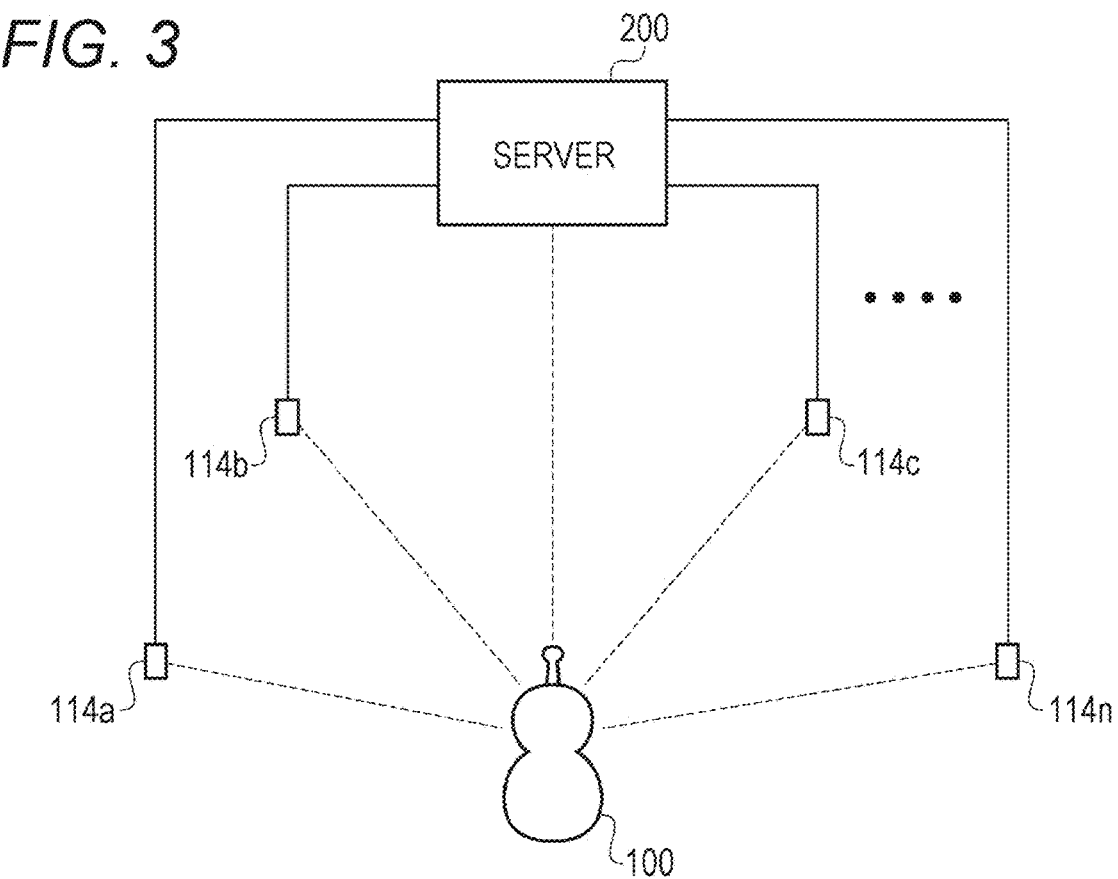
FIG. 3 is a configuration diagram of a robot system.

FIG. 3 is a configuration diagram of a robot system 300. The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in the embodiment normally correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 4:
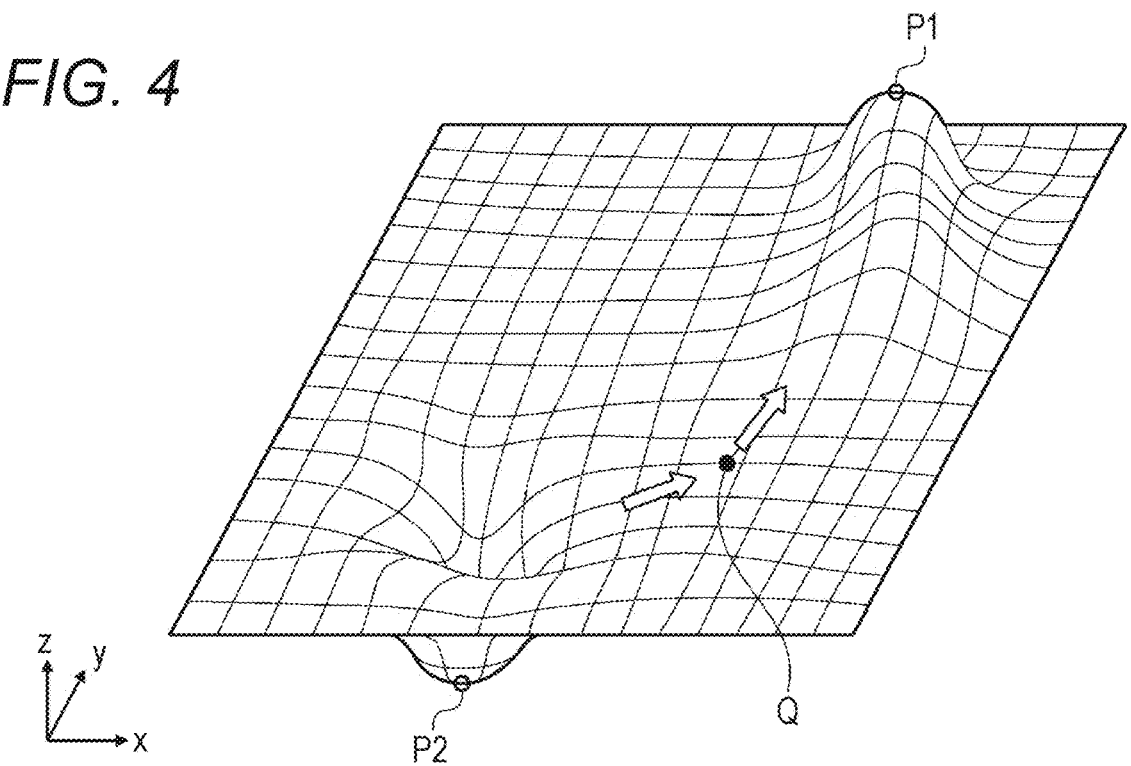
FIG. 4 is a schematic view of an emotion map.

FIG. 4 is a schematic view of an emotion map 116.

The emotion map 116 is a data table stored in the server 200. The robot 100 selects an action in accordance with the emotion map 116. The emotion map 116 shown in FIG. 4 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 4, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the front wheel 102 or the rear wheel 103, thereby identifying the current position, or may identify the current position based on an image obtained from the camera.

When the emotion map 116 shown in FIG. 4 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 4. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 also has, in addition to an action map, parameters that indicate a magnitude of various emotions or senses. For example, when a value of a loneliness emotion parameter is increasing, a weighting coefficient of an action map that evaluates places in which the robot 100 feels at ease is set high, and the value of this emotion parameter is reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 5:
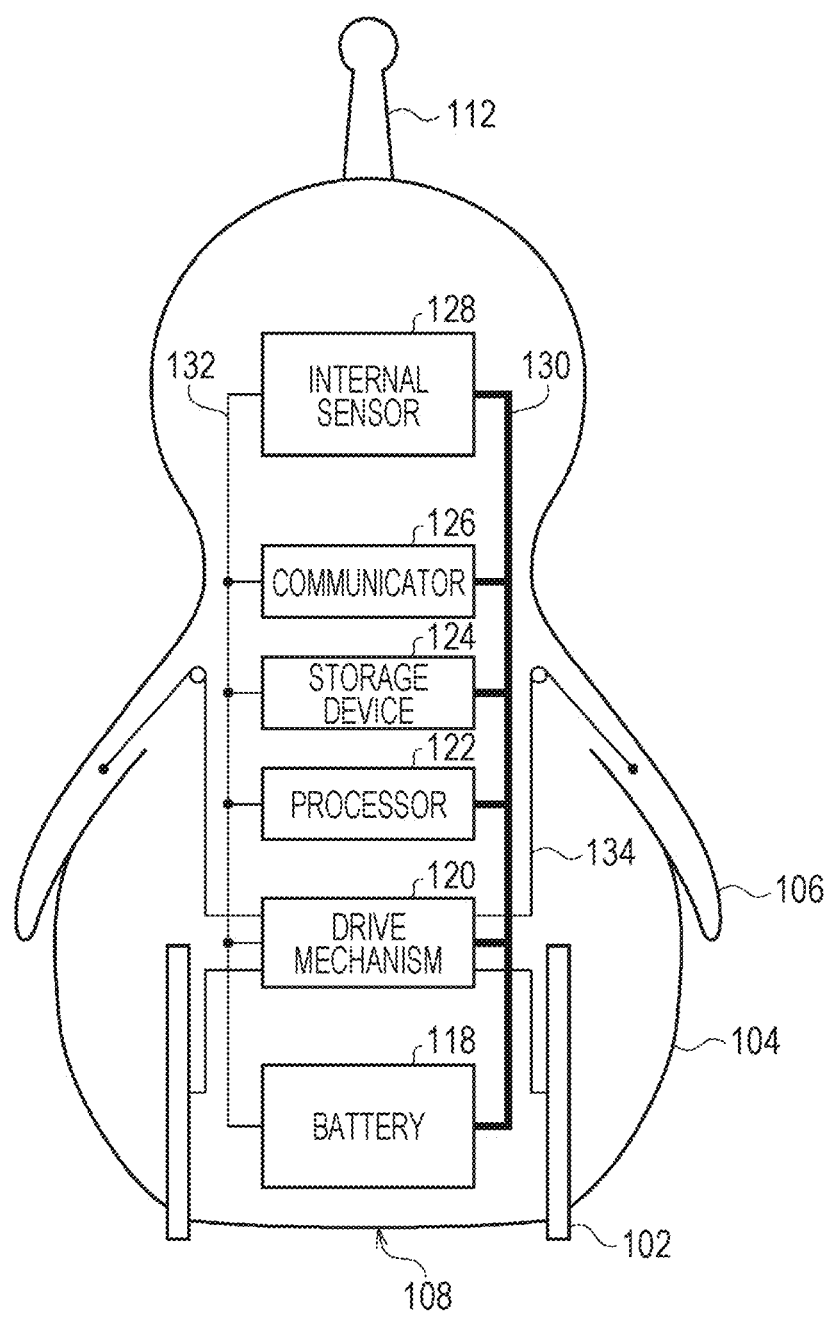
FIG. 5 is a hardware configuration diagram of the robot.

FIG. 5 is a hardware configuration diagram of the robot 100.

The robot 100 includes an internal sensor 128, a communicator 126, a storage device 124, a processor 122, a drive mechanism 120, and a battery 118. The drive mechanism 120 includes the heretofore described wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is cameras (a high resolution camera and an omnidirectional camera), a microphone array, an infrared sensor, a thermosensor, a touch sensor, an acceleration sensor, a smell sensor, and the like. The smell sensor is a commonly known sensor that applies a principle such that electrical resistance changes in accordance with adsorption of molecules that form a source of a smell. The smell sensor categorizes various smells into multiple kinds of category.

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheels (front wheels 102) and the head portion (the head portion frame 316). The drive mechanism 120 changes a direction of movement and a movement speed of the robot 100 by changing the rotational speed and the direction of rotation of each of the two front wheels 102. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state.

Figure 6:
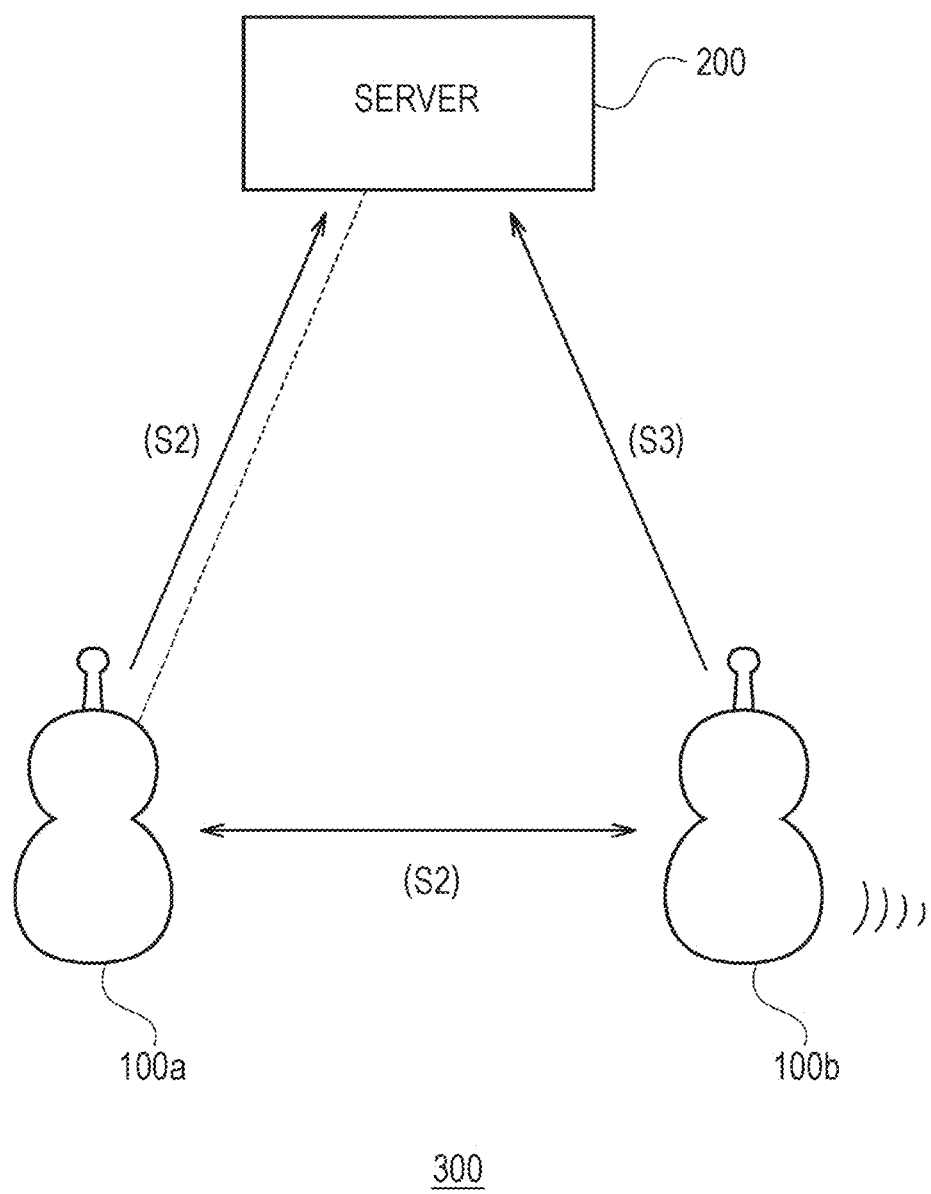
FIG. 6 is a schematic view for describing a process of accreditation of a guest robot by a host robot.

FIG. 6 is a schematic view for describing a process of accreditation of a guest robot 100b by a host robot 100a.

The robot system 300 including the server 200 and the host robot 100a can accept a new guest robot 100b. The server 200 is installed in the home X, and the host robot 100a is a robot 100 that receives behavioral support owing to the server 200 of the home X. "Accept" in this case means that the guest robot 100b, which is a visitor, can receive behavioral support from the server 200 by being connected to the server 200, and accessing resources (hardware, software, and data) managed by the server 200. The server 200 supports behavior of two robots 100, those being the host robot 100a and the guest robot 100b. Each robot 100 transmits a robot response signal including "robot ID". It is sufficient that the robot ID is information uniquely identifying the robot 100, such as a MAC address (media access control address) or a manufacturing number. By so doing, the server 200 can identify each of the two robots 100.

Hereafter, a description will be given premised on a situation wherein the guest robot 100b is brought to the home X, which is a base of the robot system 300 (the server 200 and the host robot 100a). When the guest robot 100b is accredited by the host robot 100a, the guest robot 100b can temporarily participate in the robot system 300 of the home X.

In FIG. 6, the host robot 100a is connected to the server 200. When the host robot 100a and the guest robot 100b are brought sufficiently close together, the host robot 100a accredits the guest robot 100b (S1). Details of an accreditation method will be described hereafter. The host robot 100a compiles a guest password, and the host robot 100a transmits setting information for connecting to the server 200 to the guest robot 100b. The setting information includes an IP address (Internet protocol address) of the server 200, a port number, and the guest password. The host robot 100a acquires the robot ID of the guest robot 100b.

The host robot 100a notifies the server 200 of the matter that the host robot 100a has accredited the guest robot 100b (S2). At this time, the host robot 100a transmits the robot ID and the guest password of the guest robot 100b to the server 200. The server 200 registers the robot ID and the guest password of the guest robot 100b.

Meanwhile, the guest robot 100b connects to the server 200 based on the setting information (the IP address and the port number) received from the host robot 100a (S3). The guest robot 100b transmits the robot ID and the guest password to the server 200. After collating the robot ID and the guest password, the server 200 permits connection to the guest robot 100b.

Figure 7:
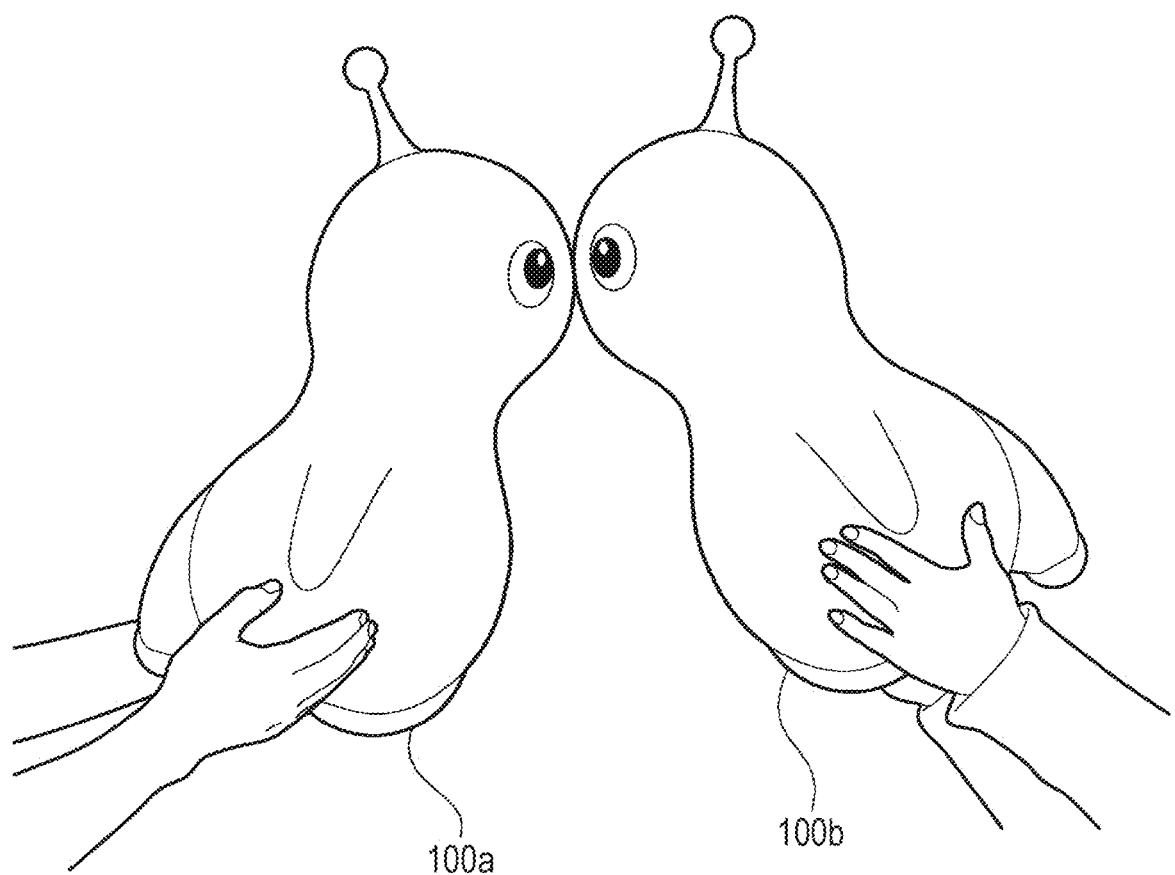
FIG. 7 is a schematic view showing an aspect of accreditation of the guest robot by the host robot.

FIG. 7 is a schematic view showing an aspect of accreditation of the guest robot 100*b* by the host robot 100*a*.

A chip compatible with NFC (near-field communication) is embedded in a forehead of the robot 100 (short-range wireless communication means). NFC is an international standard for short-range wireless communication technology, and in the embodiment, short-range communication within around ten centimeters can be carried out at 13.56 MHz. The robot 100 regularly emits robot ID using the NFC chip. By bringing the forehead of the guest robot 100*b* close to the forehead of the host robot 100*a*, the robot ID of the guest robot 100*b* is detected by the host robot 100*a*. "Accreditation" in the embodiment is completed by the host robot 100*a* detecting the robot ID of the guest robot 100*b*. The guest robot 100*b* can easily be accepted into the robot system 300 simply by bringing the foreheads of the host robot 100*a* and the guest robot 100*b* close together.

After accreditation, machine body information of the guest robot 100*b* is transmitted from the guest robot 100*b* to the host robot 100*a*. Machine body information is specification information such as a version number and a manufacturing date of the guest robot 100*b*, and mounted software and hardware.

In addition to bringing the foreheads close together, various conditions for accreditation may be added. For example, accreditation may be performed on condition that the foreheads are brought close together in a state wherein the host robot 100*a* and the guest robot 100*b* are being hugged by the respective owners. The robot 100 can recognize an owner using the camera, detect that the robot 100 is being grasped using the temperature sensor, and recognize that the robot 100 is being lifted using the acceleration sensor. By a hug by an owner being made a condition, accreditation being performed by the guest robot 100*b* happening to come near the host robot 100*a* can be prevented. Accreditation may be performed on condition that the host robot 100*a* is being hugged, accreditation may be performed on condition that the guest robot 100*b* is being hugged, or accreditation may be performed on condition that both the host robot 100*a* and the guest robot 100*b* are being hugged. An action of "hugging" is an expression of accreditation permission from an owner, and can be taken as an instruction to the host robot 100*a* to the effect that "the guest robot 100*b* may be given access to resources". In this way, the guest robot 100*b* can be accepted by a natural action of an owner.

When detecting a hug, the robot 100 houses the front wheels 102 (the left wheel 102*a* and the right wheel 102*b*) in the body 104 for reasons of safety.

Figure 8:
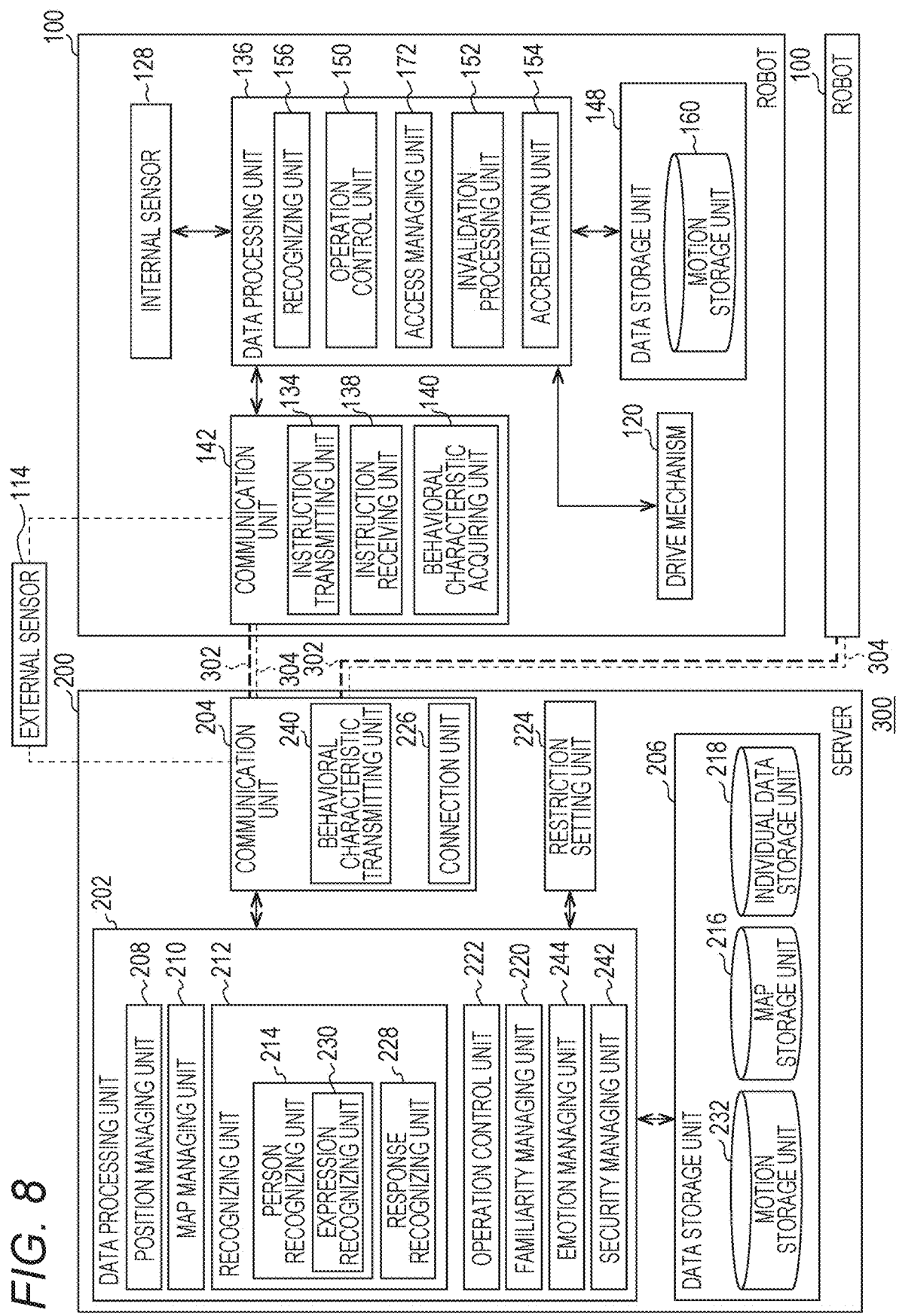
FIG. 8 is a functional block diagram of the robot system.

FIG. 8 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, a restriction setting unit 224, and a data storage unit 206.

The restriction setting unit 224 sets a behavioral restriction (to be described hereafter) with respect to the guest robot 100*b*. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204, the restriction setting unit 224, and the data storage unit 206.

The communication unit 204 includes a behavioral characteristic transmitting unit 240 and a connection unit 226. The behavioral characteristic transmitting unit 240 transmits "behavioral characteristic information" to the guest robot 100*b*. Behavioral characteristic information is information that forms a guide for action selection by the robot 100 (details to be described hereafter). The connection unit 226 receives a connection request from the robot 100, and establishes a communication line with the robot 100. In the embodiment, the communication unit 204 of the server 200 is connected to the communication unit 142 of the robot 100 by two kinds of communication line, those being a first communication line 302 (a first wireless communication line: first remote wireless communication means) and a second communication line 304 (a second wireless communication line: second remote wireless communication means). The first communication line 302 is an ISM frequency (industrial, scientific, and medical band) communication line of 920 MHz. The second communication line 304 is a communication line of 2.4 GHz. As the frequency of the first communication line 302 is lower than that of the second communication line 304, radio waves wrap around easily and stable communication is expected, but communication speed is low. Both the first communication line 302 and the second communication line 304 (remote wireless communication means) are capable of communication over a greater distance than the NFC (short-range wireless communication means).

The data storage unit 206 includes a motion storage unit 232, a map storage unit 216, and an individual data storage unit 218.

The robot 100 has a multiple of operation patterns (motions). Various motions, such as waving the arm 106, approaching an owner while meandering, and staring at an owner with the head to one side, are defined.

The motion storage unit 232 stores control details of a motion (a motion file). Each motion is identified by motion ID. The motion file is also downloaded into a motion storage unit 160 of the robot 100. Which motion is to be executed may be determined in the server 200, or may be determined in the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time for changing from a preceding unit motion to a subsequent unit motion is called an "interval". It is sufficient that an interval is defined in accordance with time needed for a unit motion change or details of a motion. A length of an interval can be regulated.

Hereafter, settings involved in controlling an action of the robot 100, such as which motion is chosen and when, and output regulation of each actuator when realizing a motion, will collectively be called "behavioral characteristics". The behavioral characteristics of the robot 100 are defined by a motion selection algorithm, a motion selection probability, a motion file, and the like.

In addition to a motion file, the motion storage unit 232 stores a motion selection table that defines a motion that should be executed when various kinds of event occur. One or more motions, and selection probabilities thereof, are correlated to an event in the motion selection table.

In addition to a multiple of action maps, the map storage unit 216 stores a map indicating a disposition state of an obstacle such as a chair or a table. The individual data storage unit 218 stores information on a user, and in particular, on an owner. Specifically, the individual data storage unit 218 stores various kinds of parameter such as familiarity with respect to a user, and physical characteristics and behavioral characteristics of the user. The individual data storage unit 218 may also store attribute information such as age and gender.

The robot system 300 (the robot 100 and the server 200) identifies a user based on the user's physical characteristics or behavioral characteristics. The robot 100 constantly films a periphery using the incorporated camera. Further, the robot 100 extracts the physical characteristics and the behavioral characteristics of a person appearing in an image. The physical characteristics may be visual characteristics associated with a body, such as a height, clothes worn by choice, a presence or absence of spectacles, a skin color, a hair color, and an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that a user identified as a father is often out of the home, and is often motionless on a sofa when at home, but a mother is often in a kitchen, and an activity range is broad.

The robot system 300 clusters users appearing with a high frequency as "owners" based on physical characteristics and behavioral characteristics obtained from a large amount of image information and other sensing information.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In this embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, a familiarity managing unit 220, an emotion managing unit 244, and a security managing unit 242.

The position managing unit 208 identifies the positional coordinates of the robot 100 using the method described using FIG. 3. The position managing unit 208 may also track positional coordinates of a user in real time.

The emotion managing unit 244 manages various emotion parameters indicating emotions (loneliness, enjoyment, fear, and the like) of the robot 100. These emotion parameters are constantly fluctuating. An importance of the multiple of action maps changes in accordance with the emotion parameters, the movement target point of the robot 100 changes depending on the action maps, and the emotion parameters change in accordance with movement of the robot 100 and the passing of time.

For example, when the emotion parameter indicating loneliness is high, the emotion managing unit 244 sets the weighting coefficient of the action map that evaluates places in which the robot 100 feels at ease to be high. When the robot 100 reaches a point in the action map at which loneliness can be eliminated, the emotion managing unit 244 reduces the emotion parameter indicating loneliness. Also, each kind of emotion parameter also changes in accordance with a responsive action, to be described hereafter. For example, the emotion parameter indicating loneliness decreases when the robot 100 is "hugged" by an owner, and the emotion parameter indicating loneliness gradually increases when the robot 100 does not visually recognize an owner for a long time.

The map managing unit 210 changes the parameter of each coordinate on the multiple of action maps using the method described in connection with FIG. 4. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 156 of the robot 100 acquires various kinds of environmental information using the internal sensor 128, and transfers the environmental information to the recognizing unit 212 of the server 200 after carrying out a primary process thereon. Specifically, the recognizing unit 156 of the robot 100 extracts images corresponding to moving objects, particularly people or animals, from an image, and sends the extracted images to the server 200. The recognizing unit 212 of the server 200 extracts characteristics of a person appearing in the extracted images.

The recognizing unit 212 further includes a person recognizing unit 214 and a response recognizing unit 228. The person recognizing unit 214 recognizes a person from an image filmed by the camera incorporated in the robot 100, and extracts the physical characteristics and the behavioral characteristics of the person. Further, based on the physical characteristic information and the behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user.

The person recognizing unit 214 also extracts characteristics of a moving object other than a person, for example, a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 of the server 200 determines a motion of the robot 100 in cooperation with an operation control unit 150 of the robot 100. The operation control unit 222 of the server 200 compiles a movement target point of the robot 100, and a movement route for the movement target point, based on an action map selection by the map managing unit 210. The movement control unit 222 compiles a multiple of movement routes, and having done so, may select any of the movement routes.

The operation control unit 222 selects a motion of the robot 100 from a multiple of motions of the motion storage unit 232. A selection probability is correlated for each situation to each motion. For example, a selection method such that a motion A is executed at a probability of 20% when a pleasant action is performed by an owner, and a motion B is executed at a probability of 5% when an air temperature is 30 degrees or higher, is defined.

A movement target point and a movement route are determined by an action map, and a motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that owner. When an unpleasant action is detected, the familiarity managing unit 220 reduces familiarity. Also, familiarity of an owner not visually recognized for a long period gradually decreases.

The guest robot 100*b* can obtain various items of information by connecting to the server 200 that manages the host robot 100*a*. The security managing unit 242 instructs the guest robot 100*b* to invalidate data acquired after the guest robot 100*b* connects to the server 200.

Robot 100

The robot 100 functions as both the host robot 100*a* and the guest robot 100*b*.

The robot 100 includes the communication unit 142, a data processing unit 136, a data storage unit 148, the internal sensor 128, and the drive mechanism 120.

The communication unit 142 corresponds to the communicator 126 (refer to FIG. 5), and manages a process of communicating with the external sensor 114, the server 200, and the other robot 100. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The communication unit 142 includes an instruction transmitting unit 134, an instruction receiving unit 138, and a behavioral characteristic acquiring unit 140.

When the robot 100 is the host robot 100*a*, the instruction transmitting unit 134 transmits a behavioral instruction (to be described hereafter) to the guest robot 100*b*. When the robot 100 is the guest robot 100*b*, the instruction receiving unit 138 receives a behavioral instruction from the host robot 100*a*. The behavioral characteristic acquiring unit 140 receives behavioral characteristic information from the behavioral characteristic transmitting unit 240 of the server 200.

The data storage unit 148 includes the motion storage unit 160, which defines various kinds of motion of the robot 100.

Various kinds of motion file are downloaded into the motion storage unit 160 of the robot 100 from the motion storage unit 232 of the server 200. A motion is identified by motion ID. An operating timing, an operating time, an operating direction, and the like, of the various kinds of actuator (the drive mechanism 120) are defined chronologically in a motion file in order to perform various motions such as sitting by housing the front wheel 102, raising the arm 106, causing the robot 100 to carry out a rotating action by causing the two front wheels 102 to rotate in reverse or by causing only one front wheel 102 to rotate, shaking by causing the front wheel 102 to rotate in a state in which the front wheel 102 is housed, or stopping once and looking back when moving away from a user.

The data processing unit 136 includes the recognizing unit 156, an operation control unit 150, an access managing unit 172, an invalidation processing unit 152, and an accreditation unit 154.

The operation control unit 150 of the robot 100 determines a motion of the robot 100 in cooperation with the operation control unit 222 of the server 200. One portion of motions may be determined by the server 200, and other motions may be determined by the robot 100. Also, a configuration may be such that the robot 100 determines a motion, but the server 200 determines a motion when a processing load of the robot 100 is high. A motion that forms a base may be determined by the server 200, and an additional motion may be determined by the robot 100. It is sufficient that a way in which a motion determining process is shared between the server 200 and the robot 100 is designed in accordance with specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheel 102 in accordance with an instruction from the operation control unit 150.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by repeatedly causing the left and right front wheels 102 to alternately rotate in reverse and stop in a housed state when bored of the "hug". The drive mechanism 120 causes the robot 100 to perform various motions by driving the front wheel 102, the arm 106, and the neck (head portion frame 316) in accordance with an instruction from the operation control unit 150.

The accreditation unit 154 executes the accreditation process described in relation to FIGS. 6 and 7. The accreditation unit 154 regularly causes the robot ID to be emitted from the NFC chip. When the robot 100 is the host robot 100a, the accreditation unit 154 accredits the guest robot 100b when receiving the robot ID from the other robot 100 (the guest robot 100b). A configuration may be such that the accreditation unit 154 emits the robot ID on condition that the recognizing unit 156 is detecting a hug of the relevant robot 100. In this case, the guest robot 100b cannot be accredited by the host robot 100a unless the guest robot 100b is being hugged. Also, a configuration may be such that the accreditation unit 154 receives the robot ID on condition that the recognizing unit 156 is detecting a hug of the relevant robot 100. In this case, the host robot 100a does not accredit the guest robot 100b unless the host robot 100a is being hugged.

When the robot 100 is the host robot 100a, the access managing unit 172 sets a right of access to the server 200 for the guest robot 100b after accreditation. When the robot 100 is the guest robot 100b, the access managing unit 172 acquires a right of access to the server 200 from the host robot 100a after accreditation. A "right of access" is a right to utilize the resources managed by the server 200. The guest robot 100b can access the server 200 using setting information provided from the host robot 100a. The behavioral restriction to be described hereafter is set in the right of access of the guest robot 100b.

When the robot 100 is the guest robot 100b, the invalidation processing unit 152 invalidates data acquired after connection to the server 200 (to be described hereafter).

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior angle using the internal camera (the internal sensor 128), and detects a moving object such as a person or a pet. An image of the moving object is transmitted to the server 200, and the person recognizing unit 214 of the server 200 extracts the physical characteristics of the moving object. Also, the recognizing unit 156 also detects a smell of a user and a voice of a user. Smell and sound (voice) are categorized into multiple kinds using an already known method.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

Of a series of recognition processes including detection, analysis, and determination, the recognizing unit 156 of the robot 100 carries out a selection and categorization of information necessary for recognition, and an interpreting process such as analysis or determination is executed by the recognizing unit 212 of the server 200. The recognition processes may be carried out by the recognizing unit 212 of the server 200 alone, or carried out by the recognizing unit 156 of the robot 100 alone, or both may execute the recognizing processes while allotting roles, as heretofore described.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which profile (cluster) a moving object near the robot 100 corresponds to using deep learning (a multilayer neural network). For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster (profile) by characteristic extraction (cluster analysis) and application to a cluster accompanying characteristic extraction (deep learning) may be executed concurrently.

Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A cluster with extremely high familiarity

The robot 100 strongly expresses a feeling of affection by approaching a user (hereafter called "an approaching action"), and by performing an affectionate gesture defined in advance as a gesture indicating goodwill toward a person.

(2) A cluster with comparatively high familiarity

The robot 100 carries out only an approaching action.

(3) A cluster with comparatively low familiarity

The robot 100 does not carry out any special action.

(4) A cluster with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

FIG. 9 is a view of a restriction setting screen 180.

The server 200 causes the restriction setting screen 180 to be displayed on a monitor (not shown). An owner A of the host robot 100*a* can impose a behavioral restriction on the guest robot 100*b*. The owner A sets "behavioral restriction information" on the restriction setting screen 180 displayed by the server 200. Behavioral restriction information is information defining an action that can be executed when the guest robot 100*b* is connected to the server 200 of the home X.

The restriction setting unit 224 acquires and saves behavioral restriction information via the restriction setting screen 180. When the guest robot 100*b* is connected to the server 200, behavioral restriction information is transmitted to the guest robot 100*b* as one portion of the behavioral characteristic information. The operation control unit 150 of the guest robot 100*b* selects an action in accordance with the behavioral restriction information.

For example, the guest robot 100*b* may be prohibited from filming the interior of the home X using the incorporated camera. When the guest robot 100*b* severs a connection to the server 200 when a filming prohibition setting is carried out, the invalidation processing unit 152 of the guest robot 100*b* annuls a filmed image acquired after connecting to the server 200. By imposing a behavioral restriction, privacy of the home X can be protected, because of which the owner A of the home X can accept the guest robot 100*b* without worry.

In addition to this, video filming may be prohibited but still image filming permitted, or recording using a microphone may be prohibited. Movement speed of the guest robot 100*b* may be set to be lower than usual, or an activity range of the guest robot 100*b* may be limited. For example, limiting the activity range of the guest robot 100*b* to the living room and the dining room also contributes to protecting privacy.

In the embodiment, a description will be given assuming that the guest robot 100*b* can move only in the living room, and that a time of a connection between the server 200 and the guest robot 100*b* is limited to 30 minutes. Behavioral restriction information set on the restriction setting screen 180 functions as, so to say, an "oath" that the guest robot 100*b* should adhere to in the home X.

Figure 10:
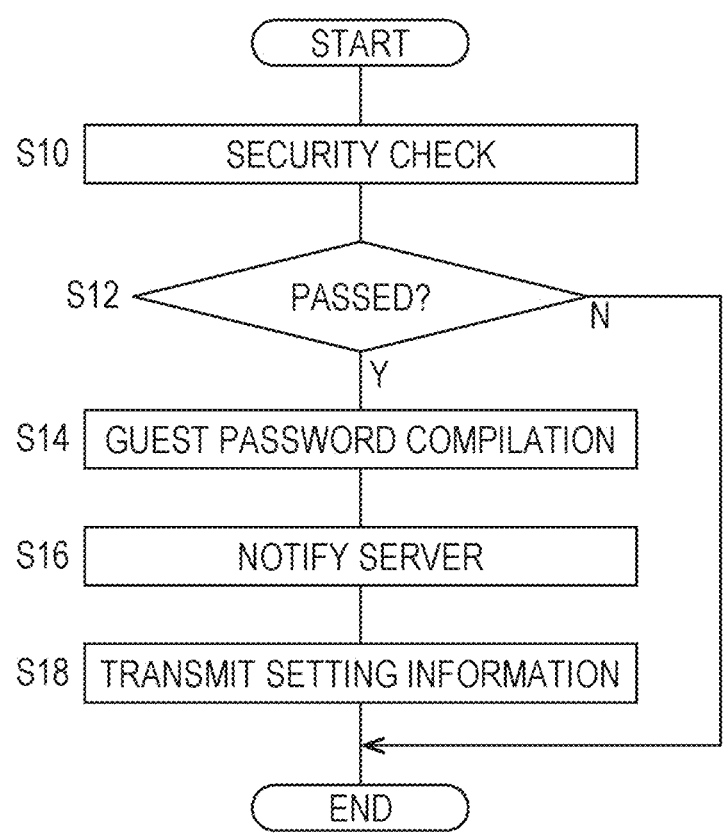
FIG. 10 is a flowchart showing an accreditation process executed when the host robot detects robot ID of the guest robot.

FIG. 10 is a flowchart showing an accreditation process executed when the host robot 100*a* detects the robot ID of the guest robot 100*b*.

The host robot 100*a* and the guest robot 100*b* come into proximity, and the accreditation unit 154 of the host robot 100*a* accredits the guest robot 100*b* when detecting the robot ID of the guest robot 100*b*, after which the accreditation process shown in FIG. 10 is executed.

The accreditation unit 154 of the host robot 100*a* detects the machine body information including the robot ID, and conducts a security check on the guest robot 100*b* (S10). The security check in the embodiment determines whether or not the latest version of predetermined security software is mounted in the guest robot 100*b*, and whether or not a search for a computer virus has been conducted within the previous six hours. By conducting the security check, a guest robot 100*b* that is infected with a computer virus being connected to the server 200 can be prevented.

When the guest robot 100*b* passes the security check, accreditation is completed (Y in S12), and the access managing unit 172 of the host robot 100*a* compiles a guest password (S14). The access managing unit 172 of the host robot 100*a* notifies the server 200 of the guest password and the robot ID of the guest robot 100*b* (S16). The server 200 registers the guest password and the robot ID. A time limit is set for the guest password and a registration period.

The access managing unit 172 of the host robot 100*a* transmits setting information of the server 200 to the guest robot 100*b* (S18). The IP address of the server 200, the port number, and the guest password are included in the setting information. When the guest robot 100*b* does not pass the security check (N in S12), the process from S14 onward is skipped. In this case, the guest robot 100*b* cannot connect to the server 200.

A configuration may be such that the host robot 100*a* does not detect robot ID, or does not emit a guest password or the like to the guest robot 100*b*, unless the host robot 100*a* is being hugged. In this case, the accreditation process is not executed unless the recognizing unit 156 is detecting a hug.

Figure 11:
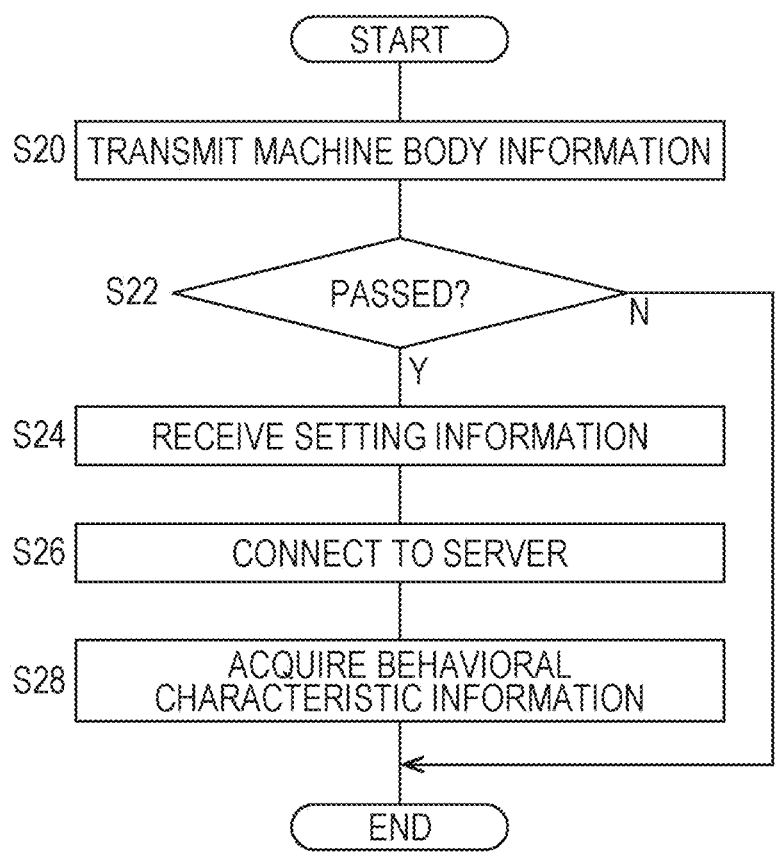
FIG. 11 is a flowchart showing an accreditation process executed when the guest robot detects robot ID of the host robot.

FIG. 11 is a flowchart showing an accreditation process executed when the guest robot 100*b* detects the robot ID of the host robot 100*a*.

When the host robot 100*a* and the guest robot 100*b* come into proximity, and the accreditation unit 154 of the guest robot 100*b* detects the robot ID of the host robot 100*a*, the guest robot 100*b* executes the accreditation process shown in FIG. 11. The accreditation process of the host robot 100*a* shown in FIG. 10 and the accreditation process of the guest robot 100*b* shown in FIG. 11 are executed simultaneously.

The accreditation unit 154 of the guest robot 100*b* transmits machine body information to 100*a* when receiving the robot ID of the host robot 100*a* (S20). The host robot 100*a* executes a security check based on the machine body information (refer to FIG. 10). When the guest robot 100*b* passes the security check (Y in S22), setting information is transmitted from the host robot 100*a*, and the communication unit 142 receives the setting information (S24). The access managing unit 172 transmits a connection request to the server 200 based on the setting information (S26). At this time, the robot ID and the guest password are transmitted.

When the robot ID and the guest password coincide, the connection unit 226 of the server 200 permits connection of the guest robot 100*b*, and the guest robot 100*b* connects to the server 200. As heretofore described, the guest robot 100*b* connects to the server 200 using two communication lines, those being the first communication line 302 and the second communication line 304. After connecting, the behavioral characteristic acquiring unit 140 receives behavioral characteristic information from the server 200 (S28).

A configuration may be such that the guest robot 100*b* does not detect robot ID, or does not emit robot ID, unless the guest robot 100*b* is being hugged. In this case, the accreditation process is not executed unless the recognizing unit 156 is detecting a hug.

After connection to the guest robot 100*b*, the map managing unit 210 of the server 200 generates an action map for the guest robot 100*b*. Also, the operation control unit 222 of the server 200 prepares a motion file and a motion selection table for the guest robot 100*b*. The action map may be generated by copying the action map of the host robot 100*a*, or may be newly generated. The same applies to the motion file and the motion selection table.

(1) A motion file and a motion selection table, (2) behavioral restriction information, and (3) knowledge information are included in the behavioral characteristic information provided to the guest robot 100*b* from the server 200. The motion file and the motion selection table are stored in the motion storage unit 160 of the guest robot 100*b*, as is the case with the host robot 100*a*. The behavioral restriction information is the information described in relation to FIG. 9. The knowledge information is information relating to the home X. The knowledge information in the embodiment is a profile (physical characteristics and behavioral characteristics) of an owner of the home X, familiarity of the host robot 100*a* toward each owner, and a floor plan of the home X. The knowledge information may be innate knowledge set in advance in the host robot 100*a*, or may be acquired knowledge gathered by sensing by the host robot 100*a* as a result of activity in the home X.

As the guest robot 100*b* can know the profile (physical and behavioral characteristics) of one or more owners of the home X by acquiring the knowledge information, the guest robot 100*b* can recognize the owner of the home X when first meeting. All or one portion of the knowledge information provided to the guest robot 100*b* may be managed for the guest robot 100*b* by the server 200, rather than being saved in the guest robot 100*b*. By acquiring the floor plan, the guest robot 100*b* can swiftly grasp a range of the home X within which action can be carried out.

By providing familiarity information, the host robot 100*a* can cause the guest robot 100*b* to have a good impression of an owner of whom the host robot 100*a* has a good impression. For example, when the familiarity of the host robot 100*a* toward the owner A is 90, the familiarity managing unit 220 may set the familiarity of the guest robot 100*b* toward the owner A when first meeting at 72, which is 80% of 90. As a favorable impression of the host robot 100*a* toward the owner A is handed on to the guest robot 100*b*, behavioral characteristics such that the guest robot 100*b* is actively involved with the owner A can be demonstrated. As the owner A liked by the host robot 100*a* is also liked by the guest robot 100*b* when first meeting, the owner A can feel him or herself to be "popular with the robot 100".

When the guest robot 100*b* does not pass the security check of the host robot 100*a* (N in S22), the process from S24 onward is skipped, and the guest robot 100*b* cannot receive behavioral support from the server 200. In this case, the guest robot 100*b* may act independently in accordance with behavioral characteristic information held by the guest robot 100*b*.

Figure 12:
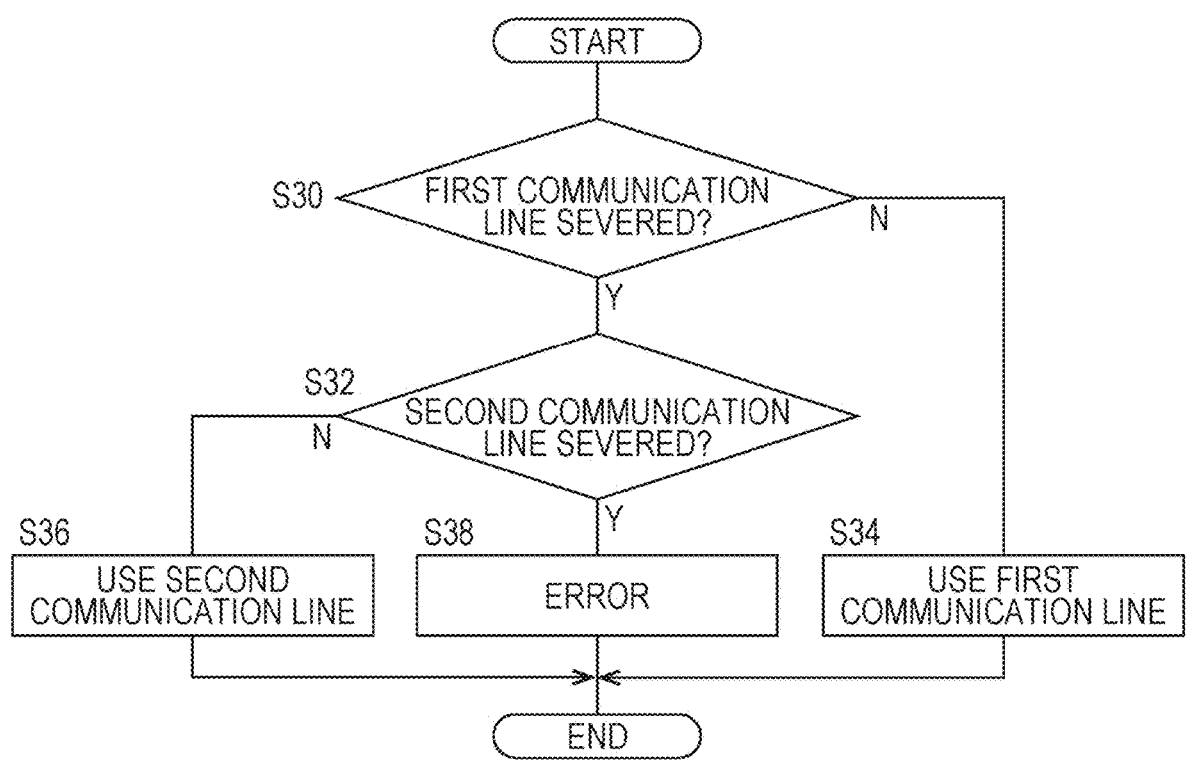
FIG. 12 is a flowchart showing a communication line backup process.

FIG. 12 is a flowchart showing a communication line backup process.

The server 200 and the robot 100 are connected by two communication lines, those being the first communication line 302 and the second communication line 304. Unless the first communication line 302 of the communication unit 204 of the server 200 is severed (N in S30), the server 200 and the robot 100 exchange data via the first communication line 302 (S34). Even when the first communication line 302 is severed (Y in S30), the server 200 and the robot 100 exchange data via the second communication line 304 (S36) provided that the second communication line 304 is being maintained (N in S32). When the second communication line 304 is also severed (Y in S32), the communication unit 226 gives notification of an error (S38).

When both the first communication line 302 and the second communication line 304 are severed, a process of reconnecting with the first communication line 302 and the second communication line 304 may be executed, or a reconnection process may be executed after a predetermined time elapses. Also, a communication connection may be carried out in another frequency band differing from that of the first communication line 302 and the second communication line 304, or an owner may be instructed to carry out a wired connection of the server 200 and the robot 100.

In addition to when the first communication line 302 is severed, a switch from the first communication line 302 to the second communication line 304 may be made when there is a failure of the first communication line 302, such as a decrease in communication throughput.

Figure 13:
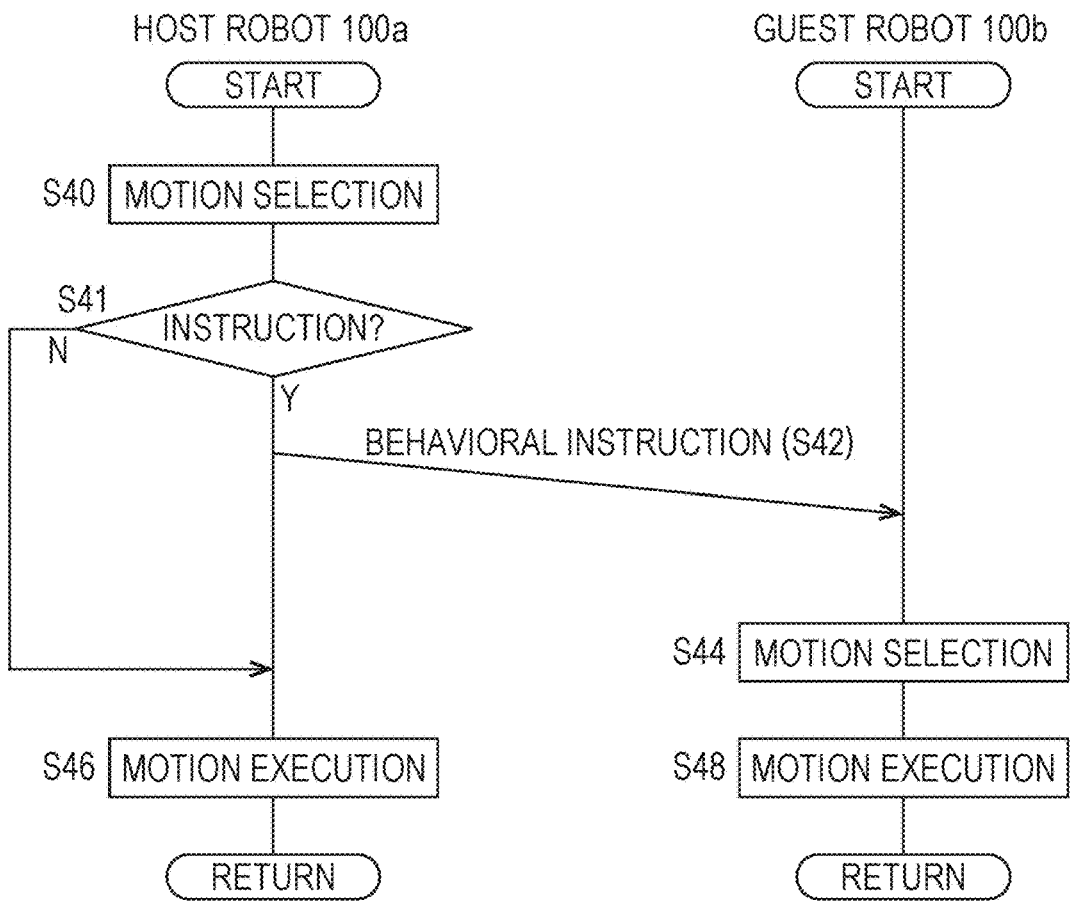
FIG. 13 is a sequence diagram showing a process when issuing a behavioral instruction from the host robot to the guest robot.

FIG. 13 is a sequence diagram showing a process when issuing a behavioral instruction from the host robot 100*a* to the guest robot 100*b*.

The host robot 100*a* selects a motion as necessary (S40). When a specific motion (hereafter called a "start-up motion") is selected (N in S41), the instruction transmitting unit 134 of the host robot 100*a* transmits a "behavioral instruction" to the guest robot 100*b* (S42). Notification of motion ID of a motion (hereafter called a "linked motion") correlated in advance to the start-up motion is given in the behavioral instruction. When no start-up motion is selected (N in S41), no behavioral instruction is transmitted. Subsequently, the host robot 100*a* executes the selected start-up motion (S46).

Meanwhile, when the instruction receiving unit 138 of the guest robot 100*b* receives the behavioral instruction, the operation control unit 150 of the guest robot 100*b* selects the specified linked motion (S44), and issues an instruction for the linked motion to be executed (S48). According to the heretofore described control, when the host robot 100*a* selects a start-up motion, the guest robot 100*b* executes a linked motion correlated to the start-up motion, because of which coordinated behavior of the host robot 100*a* and the guest robot 100*b* is realized.

For example, when the host robot 100*a* executes a start-up motion of rotating to the right, the host robot 100*a* may cause the guest robot 100*b* to execute a linked motion of rotating to the left. When the host robot 100*a* starts to rotate, the guest robot 100*b* also starts to rotate, because of which behavior exactly such that tacit communication has been established between the host robot 100*a* and the guest robot 100*b* can be expressed.

When the host robot 100*a* moves, the guest robot 100*b* may execute an action of chasing the host robot 100*a*, and when the host robot 100*a* raises the arm 106, the guest robot 100*b* too may raise the arm 106.

A configuration may be such that the host robot 100*a* always transmits a behavioral instruction when selecting a start-up motion from among the multiple kinds of motion, or such that the host robot 100*a* transmits a behavioral instruction with a predetermined probability when selecting a start-up motion. A multiple of linked motions are correlated to a start-up motion in the motion selection table, and when the host robot 100*a* selects a start-up motion, the host robot 100*a* may randomly select one of the multiple of linked motions correlated to the start-up motion.

A behavioral instruction may be issued from the host robot 100*a* to the guest robot 100*b* using ad hoc communication, or a behavioral instruction may be transmitted from the host robot 100*a* to the guest robot 100*b* via the server 200.

Figure 14:
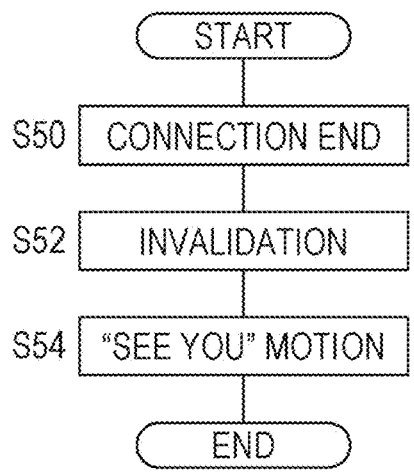
FIG. 14 is a flowchart showing a process ending a connection of the guest robot.

FIG. 14 is a flowchart showing a process ending a connection of the guest robot 100*b*.

In the embodiment, the time of a connection between the guest robot 100*b* and the server 200 is limited to 30 minutes. When the 30 minute time limit elapses, an invalidation condition is satisfied, and the communication unit 142 of the guest robot 100b causes the connection to the server 200 to end (S50). The invalidation processing unit 152 invalidates data that are data acquired after connection to the server 200 and saved in the data storage unit 148 (non-volatile memory) of the guest robot 100b (S52). Invalidation in the embodiment means completely deleting data from a storage device. When saving (removal) of knowledge information, filmed image data of the home X, recorded data, and the like, is prohibited by the behavioral restriction information, these items of information are also deleted.

After invalidation, the operation control unit 150 executes a "see you" motion of waving the arm 106 as a valedictory sign (S54). Various motions, such as bowing, pressing the body against the host robot 100a or an owner of the host robot 100a, or heading toward the hall, are conceivable as a motion executed after connection is ended.

Heretofore, the robot 100 and the robot system 300 including the robot 100 have been described based on an embodiment.

According to the embodiment, the guest robot 100b can easily be accepted into the robot system 300 of the home X simply by the host robot 100a and the guest robot 100b being brought close together. In the robot system 300, it is the robot 100 with which a user is involved, and the user is not aware of the existence of the server 200, nor does the server 200 wish to make the user aware. The accreditation process can be executed by the host robot 100a and the guest robot 100b rather than the server 200 and the guest robot 100b, because of which there is an advantage in that the user is unlikely to be made aware of the server 200 when carrying out the accreditation process either. Also, owing to an action of the host robot 100a and the guest robot 100b coming into proximity, a performance such that tacit communication appears to be established between the host robot 100a and the guest robot 100b can be executed.

The robot 100 acts as the host robot 100a with respect to the server 200 to which the robot 100 belongs, and becomes unattached when communication with the server 200 is severed, for example, when moving a predetermined distance or more from the server 200. Further, when accredited by another robot 100, the robot 100 acts as the guest robot 100b with respect to the server 200 to which the other robot 100 belongs.

Unless the host robot 100a accredits the guest robot 100b, that is, unless the guest robot 100b is brought close to the host robot 100a, the guest robot 100b cannot access the resources managed by the server 200. Owing to this kind of physical accreditation of "bringing close" being a condition for setting the right of access to the resources of the server 200, a leak of information from the server 200 can be restricted.

After connection to the server 200, the guest robot 100b acquires behavioral characteristic information from the server 200. As the guest robot 100b can acquire the floor plan of the home X and a profile of a master of the home X, whom the guest robot 100b is meeting for the first time, the guest robot 100b can easily adopt appropriate behavior in the home X at an early stage.

A behavioral restriction can be imposed on the guest robot 100b in the home X. Also, data acquired by the guest robot 100b after connection to the server 200 can be invalidated. As conditions relating to safety and security can be imposed on the guest robot 100b, the guest robot 100b can easily be accepted without worry.

By issuing a behavioral instruction from the host robot 100a to the guest robot 100b, coordinated behavior of the host robot 100a and the guest robot 100b can be executed. A behavioral expression unique to a multiple of robots 100 can be executed, because of which a special enjoyment of taking an owned robot 100 into another home, or accepting a robot 100 from another home, can be provided.

In the robot system 300 in the embodiment, the server 200 and the robot 100 are doubly connected by two communication lines, those being the first communication line 302 and the second communication line 304. Even when one of the first communication line 302 and the second communication line 304 fails, communication can be continued using the other, because of which communication between the server 200 and the robot 100 can be strengthened.

The invention not being limited to the heretofore described embodiment or a modified example, components can be changed or embodied without departing from the scope of the invention. Various inventions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

In addition to an action map, a floor plan, a profile, and familiarity information, various resources are conceivable as resources accessible by the guest robot 100b after accreditation. For example, by providing temperature distribution information of the home X, the guest robot 100b can immediately ascertain a cool place or a warm place without measuring temperature by itself. Various information, such as a place enclosed by walls, which is safe and where the guest robot 100b is unlikely to be visually recognized, may be provided.

When conducting the security check (S20 in FIG. 11), the host robot 100a may check that no illicit application software, such as spyware, is mounted in the guest robot 100b. Illicit application software may be registered in advance as an illicit list in the server 200. The host robot 100a accesses 200, refers to the illicit list, and confirms that no illicit application is mounted in the guest robot 100b.

When conducting the security check, the host robot 100a may check the version of firmware of the guest robot 100b, or may confirm whether or not the guest robot 100b is a genuine product by asking the maker for the manufacturing number of the guest robot 100*b*. When application software whose use is prohibited in the home X is mounted in the guest robot 100*b*, the host robot 100*a* may refuse connection of the guest robot 100*b* to the server 200, or may permit connection to the server 200 on condition that the use of that kind of application is stopped. For example, when image transmitting software is mounted in the guest robot 100*b* in a case in which software that transmits an image to the exterior is prohibited in the home X, the security managing unit 242 of the server 200 may instruct the guest robot 100*b* to stop executing the process of the image transmitting software.

In the embodiment, the right of access to the server 200 is provided from the host robot 100*a* to the guest robot 100*b* as setting information. As a modified example, the server 200 may accredit the guest robot 100*b* when the guest robot 100*b* is brought close to the server 200. A configuration may be such that the server 200 provides setting information to the guest robot 100*b* after accreditation, and the guest robot 100*b* connects to the server 200 based on the setting information.

Rather than the host robot 100*a* conducting the security check of the guest robot 100*b*, the server 200 may execute the security check of the guest robot 100*b*. Also, the security check may be conducted by the host robot 100*a* or the server 200 posing a question relating to security to the guest robot 100*b*, and the guest robot 100*b* returning an answer to the question to the host robot 100*a* or the server 200. Accreditation of the guest robot 100*b* may be executed by the host robot 100*a* asking the guest robot 100*b* for the manufacturing number, the guest robot 100*b* returning the manufacturing number of the guest robot 100*b* to the server 200, and the server 200 asking the maker of the robot 100 whether the manufacturing number is that of a genuine product.

Various settings, such as a camera resolution limit, specification of a place in which filming is prohibited, specification of a range within which an action can be carried out, prohibition of data removal or external transmission, and prohibition of saving data in a non-volatile memory, can be included in the behavior restricting information provided to the guest robot 100*b* from the server 200. When the guest robot 100*b* is connected to the server 200, the guest robot 100*b* may be prohibited from establishing a communication line with a device other than the host robot 100*a* or the server 200.

The robot 100 may include two operating modes, those being a normal mode and a restrictive mode. Various behavioral limits, such as a movement speed limit, a communication limit, or a camera or microphone usage limit, are set in the restrictive mode. When the guest robot 100*b* connects to the server 200, the guest robot 100*b* may change a setting to the restrictive mode. The guest robot 100*b* may automatically change to the restrictive mode when connecting to the server 200, or the host robot 100*a* or the server 200 (the security managing unit 242) may instruct the guest robot 100*b* to change to the restrictive mode.

A multiple of host robots 100*a* may be connected to the server 200. A two-dimensional code is printed in a manual of the robot system 300, and when a first host robot 100*a* (hereafter written as a "first host robot 100*a*1") films the two-dimensional code using the camera, the first host robot 100*a*1 is connected to the server 200. The server 200 registers the robot ID of the first host robot 100*a*1 as a "host". When a second host robot 100*a* (hereafter written as a "second host robot 100*a*2") films the two-dimensional code using the camera, the second host robot 100*a*2 is also connected to the server 200. At this time too, the server 200 registers the robot ID of the second host robot 100*a*2 as a "host".

After purchasing the first host robot 100*a*1, a user may further purchase the second host robot 100*a*2. In this case, the first host robot 100*a*1 corresponds to "an elder brother or an elder sister", and the second host robot 100*a*2 corresponds to "a younger brother or a younger sister". The guest robot 100*b* corresponds to "a friend". This kind of relationship is also effective in causing an image of a human relationship or a blood relationship to be projected onto a multiple of robots 100. When the second host robot 100*a*2 is registered, knowledge information of the first host robot 100*a*1 may be taught to the second host robot 100*a*2. Also, a behavioral restriction may be set until the second host robot 100*a*2 becomes accustomed to the home.

When a predetermined registration input into the server 200 is carried out, the server 200 may cause a two-dimensional code to be displayed on the monitor. A configuration may be such that when the first host robot 100*a*1 is brought close to the server 200 within a predetermined time from the predetermined registration input into the server 200 being carried out, the server 200 registers the first host robot 100*a*1 as a host. A robot 100 that accesses secret information such as a two-dimensional code may be registered as a "host", and a robot 100 accredited by the host robot 100*a* may be registered as a "guest".

In the embodiment, the server 200 and the robot 100 are connected by two kinds of communication line in differing frequency bands. When one communication line fails, a data exchange is carried out using the other communication line. As a modified example, the same data may constantly be exchanged simultaneously on the two communication lines. When a failure of the first communication line 302 is detected by either the robot 100 or the server 200, the robot 100 executes a reconnection by the first communication line 302 to the server 200. Reconnection to the robot 100 may be executed from the server 200.

A behavioral instruction from the host robot 100*a* to the guest robot 100*b* may be an instruction to the guest robot 100*b* to select a linked motion, or may express a "playing" between two or more robots 100. For example, the behavioral instruction may be an instruction for "a game of tag", wherein the host robot 100*a* runs around the room trying to escape, and the guest robot 100*b* chases the host robot 100*a*. The guest robot 100*b* and the host robot 100*a* detect each other's touch using the incorporated touch sensor. When the guest robot 100*b* touches the host robot 100*a*, the guest robot 100*b* tries to escape, and the host robot 100*a* becomes "it" and chases the guest robot 100*b*.

In the same way, "hide-and-seek", wherein the host robot 100*a* hides in a place enclosed by walls and a ceiling, such as behind a sofa or under a table, and the guest robot 100*b* looks for the place, may be executed.

Not only does the host robot 100*a* issue a behavioral instruction to the guest robot 100*b*, but also the guest robot 100*b* may issue a behavioral instruction to the host robot 100*a*. For example, a configuration may be such that when the manufacturing date of the guest robot 100*b* is older than that of the host robot 100*a*, a behavioral instruction is issued from the guest robot 100*b* to the host robot 100*a*. Specifically, the data storage unit 206 of the server 200 has a robot information storage unit (not shown). The robot information storage unit stores various kinds of robot information relating to a robot 100 currently connected, such as the robot ID, the manufacturing date, a distinction between host and guest, a failure history, and a place of manufacture (a hometown). The communication unit 142 of the robot 100 transmits robot information held by the robot 100 when connected to the server 200. A robot information registering unit (not shown) of the server 200 records the robot information of the newly connected robot 100 in the robot information storage unit. The communication unit 204 of the server 200 transmits the robot information of each robot 100 to one or more currently connected robots 100. According to this kind of control, a multiple of robots 100 connected to the same server 200 share robot information with each other. The recognizing unit 156 of the robot 100 compares the robot information (manufacturing date) of the other robot 100 and the robot information (manufacturing date) of the robot 100. When the manufacturing date is older than that of the other robot 100, the operation control unit 150 transmits a behavioral instruction to the "younger robot 100" via the instruction transmitting unit 134. Meanwhile, no behavioral instruction is transmitted to the "older robot 100" with the older manufacturing date. This kind of relationship is also effective in causing an image of a hierarchical relationship to be projected onto a multiple of robots 100.

Even when the guest robot 100*b* receives a behavioral instruction from the host robot 100*a*, the guest robot 100*b* may refuse the behavioral instruction with a predetermined probability. The robot 100 may manage familiarity with respect to the other robot 100. Specifically, the familiarity managing unit 220 of the server 200 collectively manages the familiarity between the robot 100 and the robot 100. In the above case, the server 200 individually manages the familiarity of the host robot 100*a* toward the guest robot 100*b* and the familiarity of the guest robot 100*b* toward the host robot 100*a*. For example, a high familiarity may be set for robots 100 that often meet or robots 100 that issue a large number of behavioral instructions to each other. A configuration may be such that the higher the familiarity, the further the probability of a behavioral instruction being refused decreases, or the easier it becomes to transmit behavioral instructions at a high frequency. With respect to a host robot 100*a* for which familiarity is set to a predetermined value or greater as seen from the guest robot 100*b* (a robot 100 liked by the guest robot 100*b*), a behavioral instruction may be transmitted from the guest robot 100*b* to the host robot 100*a*. When a behavioral instruction is received, the communication unit 142 of the robot 100 asks the server 200 for the familiarity with respect to the robot 100 that has issued the behavioral instruction, and the operation control unit 150 determines whether to consent to or refuse the behavioral instruction in accordance with the familiarity with respect to the robot 100.

The host robot 100*a* and the guest robot 100*b* may execute a start-up motion and a linked motion respectively by arranging execution timings. When the behavioral instruction (S42) in FIG. 13 is issued, the execution timing of a linked motion may be specified to be "three seconds later". Further, by the host robot 100*a* executing a start-up motion with the same timing, "harmonious coordinated behavior" can be expressed.

When carrying out the data invalidation (S52) in FIG. 14, the data may be completely deleted from the non-volatile memory, or the data may be rendered into a rewritable state (an unsaved state). Data that are a target of deletion are all or one portion of data acquired after connection to the server 200. A configuration may be such that data acquired after connection to the server 200 can only be recorded in a volatile memory.

Data invalidation may be carried out when a predetermined time limit from the guest robot 100*b* connecting to the server 200 elapses, or may be executed when the guest robot 100*b* moves a predetermined distance or more away from the server 200. For example, when the guest robot 100*b* is no longer detected by any external sensor 114 managed by the server 200, the security managing unit 242 of the server 200 may instruct the guest robot 100*b* to carry out data invalidation.

Data invalidation may be executed by the guest robot 100*b* itself when a predetermined invalidation condition is satisfied, or the security managing unit 242 of the server 200 may instruct the guest robot 100*b* to execute data invalidation. For example, the security managing unit 242 of the server 200 may issue an instruction for data invalidation when the guest robot 100*b* collides with an object in the home X, when the guest robot 100*b* moves a predetermined distance or more away from the host robot 100*a*, or when an abnormal signal is detected from the guest robot 100*b*.

The guest robot 100*b* may present data held when connection to the server 200 is ended to the server 200. An owner of the home X may check data displayed in the server 200, such as a filmed image, recorded data, or a profile, and instruct the guest robot 100*b* to invalidate data selected by the owner.

As heretofore described, the server 200 provides an accreditation right to the host robot 100*a*, and the host robot 100*a* accredits the guest robot 100*b* as a representative of the server 200. The guest robot 100*b* acquires the right of access to the server 200 by being accredited by the host robot 100*a*. This kind of accreditation method is not only applicable to the robot system 300. For example, a configuration may be such that when a mobile terminal A (a first device) accredits a separate mobile terminal B (a second device) in a state wherein a content server and the mobile terminal A are connected, the mobile terminal B can access the content server.

A user of the mobile terminal B can connect to the content server simply by being accredited by the mobile terminal A, without accessing a main body of the content server. At this time too, a limit may be set on resources the mobile terminal B can access, and on an access time.

The guest robot 100*b* may save a profile of an owner B of the guest robot 100*b*, and bring the profile into the home X. Further, the guest robot 100*b* may teach the host robot 100*a* the profile of the owner B. In this case, the host robot 100*a* easily recognizes the owner B, even when first meeting. When the guest robot 100*b* interrupts the connection to the server 200, the security managing unit 242 of the server 200 may independently invalidate the profile of the owner B.

The robot system 300 need not include an accreditation function, a behavioral instruction function, or the like from the time of shipping from the factory. After the robot system 300 is shipped, functional strengthening of the robot system 300 may be realized by downloading a behavior control program that realizes these functions via a communication network.

The invention claimed is:
1. A robot, comprising:
   a non-transitory computer readable medium configured to store instructions thereon;
   a first transceiver for receiving information from a resource that a host robot, different from the robot, has access to;
   a processor connected to the non-transitory computer readable medium and the first transceiver, wherein the processor is configured to execute the instructions for:

determining whether a positional relation of a predetermined portion of the robot with a predetermined portion of the host robot satisfies a first predetermined condition; and
instructing the first transceiver to request the information from the resource in response to a determination that the robot has access to the resource;
a drive mechanism for driving the robot to move according to movement instructions generated by the processor;
a group of sensors including a sensor for detecting a hugging of the robot,
wherein the processor is further configured to execute the instructions for:
determining a direction of movement of the robot according to an output of the group of sensors,
outputting the movement instruction to the drive mechanism to move the robot toward a point in the determined direction of movement;
judging, in response to an output of the sensor, whether a second predetermined condition in which the robot is being hugged, is met, and
obtaining an accreditation from the host robot and a right to access to the resource through the first transceiver when the positional relation is determined to satisfy the first predetermined condition and judging that the second predetermined condition is met.

2. The robot according to claim 1, wherein the processor is configured to execute the instructions for determining whether the robot has the right to access to the resource in response to detecting hugging by the user while the positional relation satisfies the first predetermined condition.

3. The robot according to claim 1, wherein the first transceiver is configured to use near-field type wireless communication for detecting the predetermined portion of the host robot.

4. The robot according to claim 1, further comprising:
a second transceiver separate from the first transceiver, wherein the second transceiver is configured for wireless communication across a greater distance than the first transceiver.

5. The robot according to claim 1, wherein the processor is configured to execute the instructions for:
requesting the first transceiver to retrieve behavioral characteristic information from the resource, wherein the behavioral characteristic information is based on behavioral characteristics of the host robot, and
selecting a motion based on the behavioral characteristic information.

6. The according to claim 1, wherein the processor is configured to execute the instructions for restricting user information transmitted to the resource from the robot.

7. The robot according to claim 1, wherein the processor is configured to execute the instructions for determining the robot does not have the right to access to the resource, after a determination that the robot does have access to the resource, in response to satisfaction of a predetermined invalidation condition is satisfied.

8. The robot according to claim 1, wherein the processor is configured to execute the instructions for:
instructing the first transceiver to request a behavioral instruction from the host robot, and
selecting a motion based on the behavioral instruction.

9. The robot according to claim 1, further comprising a second transceiver separate from the first transceiver, wherein the second transceiver is configured to communicate in a different frequency band than the first transceiver, and
the processor is configured to execute the instructions for instructing the second transceiver to retrieve the information from the resource in response to a determination that the first transceiver failed to retrieve the information from the resource.

10. The robot according to claim 1, wherein the processor is configured to determine the first predetermined condition is satisfied in response to a determination that a first predetermined portion of the robot is within a predetermined distance from a second predetermined position of the host robot.

11. The robot according to claim 1, wherein the processor is configured to determine the first predetermined condition is satisfied in response to a determination that a first predetermined portion of the robot is brought close to a second predetermined portion of the robot.

12. The robot according to claim 1, wherein the processor is configured to determine the first predetermined condition is satisfied in response to a determination that communication under a standard of near-field communication (NFC) is established.

13. A robot, comprising:
a non-transitory computer readable medium configured to store instructions thereon;
a sensor configured to detect a hug by a user;
a first transceiver configured to communicate with a resource; and
a processor connected to the non-transitory computer readable medium, the sensor and the first transceiver, wherein the processor is configured to execute the instructions for:
determining whether a positional relation of a predetermined portion of the robot with a predetermined portion of a guest robot, different from the robot, satisfies a first predetermined condition;
judging, in response to an output of the sensor, whether a second predetermined condition, in which the robot is being hugged, is satisfied; and
granting the guest robot accreditation for accessing the resource in response to the determination that the positional relation is determined to satisfy the first predetermined condition and the second predetermined condition is satisfied;
managing rights of access of the guest robot to the resource in response to granting the guest robot access to the resource.

14. The robot according to claim 13, wherein the processor is configured to execute the instructions for:
instructing the first transceiver to retrieve behavioral characteristic information from the resource; and
selecting a motion in accordance with the retrieved behavioral characteristic information; and
the robot further comprises a drive mechanism configured to execute the selected motion.

15. The robot according to claim 13, wherein the first transceiver is configured to detect the predetermined portion of the guest robot using near-field type wireless communication.

16. The robot according to claim 13, further comprising:
a second transceiver separate from the first transceiver, wherein the second transceiver is configured for wireless communication across a greater distance than the first transceiver.

17. The robot according to claim 13, wherein the sensor is configured to detect lifting by the user, and the processor is configured to execute the instructions for granting access to the guest robot in response to the determination that the positional relation satisfies the first predetermined condition while the robot is being lifted.

18. The robot according to claim 13, wherein the processor is configured to execute the instructions for instructing the first transceiver to transmit a behavioral instruction to the guest robot.

19. The robot according to claim 13, wherein the processor is configured to execute the instructions for conducting a security check of the guest robot prior to granting the guest robot accreditation for accessing the resource.

20. A server, comprising:

a non-transitory computer readable medium configured to store instructions thereon;

a first transceiver; and a processor connected to the non-transitory computer readable medium and the first transceiver, wherein the processor is configured to execute the instructions for:

transmitting behavioral characteristic information to a host robot;

receiving an accreditation signal indicating that a first predetermined condition and a second predetermined condition are satisfied for granting a guest robot access to the server, wherein the first predetermined condition comprises a positional relation of the host robot and the guest robot is within a predetermined threshold, and the second predetermined condition comprises a sensor of at least one of the host robot or the guest robot indicates hugging by a user; and distinguishing the guest robot from the host robot in response to receiving the accreditation signal indicating that the guest robot has accreditation for accessing the server; and transmitting the behavioral characteristic information to the guest robot, wherein the behavioral characteristic information limits a portion of functions of the guest robot.

21. The server according to claim 20, wherein the portion of functions of the guest robot is related to privacy of the user.

22. The server according to claim 20, wherein the behavioral characteristic information includes knowledge information possessed by the host robot.

23. The server according to claim 20, wherein the server is configured to execute the instructions for instructing the first transceiver to transmit a signal to the guest robot to carry out data invalidation regardless of a received user operation.

* * * * *